(12) United States Patent
Templin

(10) Patent No.: US 11,941,999 B2
(45) Date of Patent: Mar. 26, 2024

(54) TECHNIQUES FOR DIAGNOSTIC ASSESSMENT

(71) Applicant: Instructure, Inc., Salt Lake City, UT (US)

(72) Inventor: Jonathan Templin, Lawrence, KS (US)

(73) Assignee: INSTRUCTURE, INC., Salt Lake City, UT (US)

( * ) Notice: Subject to any disclaimer, the term of this patent is extended or adjusted under 35 U.S.C. 154(b) by 603 days.

(21) Appl. No.: 16/780,574

(22) Filed: Feb. 3, 2020

(65) Prior Publication Data
US 2020/0273363 A1 Aug. 27, 2020

Related U.S. Application Data

(60) Provisional application No. 62/808,616, filed on Feb. 21, 2019.

(51) Int. Cl.
| | | |
|---|---|---|
| *G09B 7/02* | (2006.01) | |
| *G06F 18/2415* | (2023.01) | |
| *G06N 7/01* | (2023.01) | |
| *G09B 7/00* | (2006.01) | |
| *G09B 7/04* | (2006.01) | |

(52) U.S. Cl.
CPC ......... *G09B 7/02* (2013.01); *G06F 18/24155* (2023.01); *G06N 7/01* (2023.01); *G09B 7/00* (2013.01); *G09B 7/04* (2013.01)

(58) Field of Classification Search
CPC ... G09B 7/00; G09B 7/02; G09B 7/04; G09B 7/01; G06K 9/6278; G06N 7/005; G06F 18/24155
See application file for complete search history.

(56) References Cited

U.S. PATENT DOCUMENTS

| | | | | |
|---|---|---|---|---|
| 6,260,033 B1 * | 7/2001 | Tatsuoka | ............ | G06Q 30/0203 706/50 |
| 10,552,764 B1 * | 2/2020 | Carlin | ............... | G06N 7/01 |
| 2003/0232314 A1 * | 12/2003 | Stout | .................... | G09B 23/02 434/322 |

(Continued)

FOREIGN PATENT DOCUMENTS

KR 20040083258 A 10/2004

OTHER PUBLICATIONS

PCT International Search Report and Written Opinion of the International Searching Authority for International Application No. PCT/US2020/018959, dated Jun. 15, 2020, 9 pages.

(Continued)

*Primary Examiner* — Jack Yip
(74) *Attorney, Agent, or Firm* — Dorsey & Whitney LLP

(57) ABSTRACT

Techniques, methods, systems, and devices for diagnostic assessment of a respondent are described. The techniques for diagnostic assessment may use a classification model to characterize multiple dimensions of the respondent. The classification model may characterize the respondent as having an attribute (e.g., unobserved variable) that is measured by one or more outcomes (e.g., observed variables). The outcomes may be based on responses received from the respondent to items on an assessment. The classification model may also characterize one or more item parameters associated with the items of the assessment.

20 Claims, 7 Drawing Sheets

(56) References Cited

U.S. PATENT DOCUMENTS

| | | | |
|---|---|---|---|
| 2006/0003303 A1* | 1/2006 | Almond | G09B 7/00 434/118 |
| 2007/0299644 A1* | 12/2007 | Roussos | G09B 7/02 703/11 |
| 2008/0124696 A1* | 5/2008 | Houser | G09B 7/08 434/350 |
| 2009/0004638 A1 | 1/2009 | Stout et al. | |
| 2012/0196261 A1* | 8/2012 | Kim | G09B 5/062 434/322 |
| 2015/0170536 A1* | 6/2015 | Lan | G06N 20/00 434/350 |
| 2015/0243179 A1* | 8/2015 | Zaslavsky | G06F 40/131 434/327 |
| 2015/0339938 A1 | 11/2015 | Sampath | |
| 2016/0321585 A1* | 11/2016 | Saraswat | G06N 7/01 |
| 2017/0287348 A1 | 10/2017 | Mosher et al. | |
| 2018/0151083 A1* | 5/2018 | Yoo | G09B 5/08 |
| 2018/0315063 A1 | 11/2018 | Cheesman | |
| 2019/0080628 A1* | 3/2019 | Olsen | G09B 5/00 |
| 2019/0378429 A1* | 12/2019 | Panuganty | G06F 40/10 |

OTHER PUBLICATIONS

Henson et al., Defining a Family of Cognitive Diagnosis Models Using Log-Linear Models with Latent Variables, Jun. 2009, pp. 191-210, PSYCHOMETRIKA—vol. 74, No. 2, The Psychometric Society.

Albert et al., Bayesian Analysis of Binary and Polychotomous Response Data, Journal of the American Statistical Association, Junune 1993, pp. 669-679, vol. 88, No. 422, American Statistical Association.

* cited by examiner

Relationship Matrix

|        | Attribute #1 | Attribute #2 | Attribute #3 | Attribute #4 | ... | Attribute #M |
|--------|--------------|--------------|--------------|--------------|-----|--------------|
| Item #1 | 1 | 1 | 0 | 0 | ... | 0 |
| Item #2 | 0 | 0 | 0 | 1 | ... | 0 |
| Item #3 | 1 | 0 | 1 | 0 | ... | 0 |
| ⋮ | ⋮ | ⋮ | ⋮ | ⋮ | ⋮ | ⋮ |
| Item #N | 0 | 0 | 0 | 0 | ... | 0 |

Attribute Profiles of Respondents

| | Attribute #1 | Attribute #2 | Attribute #3 | Attribute #4 | ••• | Attribute #N |
|---|---|---|---|---|---|---|
| Respondent #1 | 1 | 1 | 0 | 0 | ••• | 0 |
| Respondent #2 | 0 | 1 | 0 | 1 | ••• | 0 |
| Respondent #3 | 1 | 0 | 1 | 0 | ••• | 0 |
| ⋮ | ⋮ | ⋮ | ⋮ | ⋮ | | ⋮ |
| Respondent #R | 1 | 1 | 1 | 1 | ••• | 1 |

FIG. 3

TECHNIQUES FOR DIAGNOSTIC ASSESSMENT

RELATED APPLICATIONS

This application claims priority to U.S. Provisional Patent Application No. 62/808,616, filed Feb. 21, 2019, and entitled "TECHNIQUES FOR DIAGNOSTIC ASSESSMENT," which is incorporated by reference herein.

The following relates generally to psychometrics and psychometric models, and more specifically to techniques for diagnostic assessment.

BACKGROUND

Testing may be used to measure the skill, knowledge, intelligence, capacities, or aptitudes of an individual or group. Examples of testing used to measure such qualities of an examinee may include entrance exams for higher education or achievement testing at the primary and secondary school levels. Individuals may be admitted into an institutions, receive certifications, or achieve other results based on the results of the tests. An administrator of a test and an examinee of the test may find it desirable to use the results of the test to characterize the abilities of the examinee accurately.

SUMMARY

A method of diagnostic assessment is described. In some cases, the method may be implemented by a computer, computing device, or computing system and the functions described herein may involve an act by the computer, computing device, or computing system. The method may include receiving responses generated by respondents to items configured to classify at least one ability of the respondents, identifying a mapping of the items to a set of attributes associated with the respondents, identifying a set of attribute profiles representing what attributes are possessed by the respondents, each attribute profile including a pattern of descriptive statistics indicating a permutation of possessed attributes, identifying one or more item parameters for each item based on the mapping of the items to the set of attributes, where a set of item parameters of the one or more item parameters associated with a first item is subject to a set of linear monotonicity constraints such that the set of item parameters and a first attribute profile of the set of attribute profiles associated with the first item is greater than zero, determining a set of probabilities for each item based on identifying the one or more item parameters, each probability indicating a likelihood of a respective response to a respective item conditional on a respective attribute profile of a respective respondent, and classifying the respondents with attribute profiles based on the responses received for the items and determining the set of probabilities for each item.

An apparatus for diagnostic assessment is described. The apparatus may include a processor, memory in electronic communication with the processor, and instructions stored in the memory. The instructions may be executable by the processor to cause the apparatus to receive responses generated by respondents to items configured to classify at least one ability of the respondents, identify a mapping of the items to a set of attributes associated with the respondents, identify a set of attribute profiles representing what attributes are possessed by the respondents, each attribute profile including a pattern of descriptive statistics indicating a permutation of possessed attributes, identify one or more item parameters for each item based on the mapping of the items to the set of attributes, where a set of item parameters of the one or more item parameters associated with a first item is subject to a set of linear monotonicity constraints such that the set of item parameters and a first attribute profile of the set of attribute profiles associated with the first item is greater than zero, determine a set of probabilities for each item based on identifying the one or more item parameters, each probability indicating a likelihood of a respective response to a respective item conditional on a respective attribute profile of a respective respondent, and classify the respondents with attribute profiles based on the responses received for the items and determining the set of probabilities for each item.

Another apparatus for diagnostic assessment is described. The apparatus may include means for receiving responses generated by respondents to items configured to classify at least one ability of the respondents, identifying a mapping of the items to a set of attributes associated with the respondents, identifying a set of attribute profiles representing what attributes are possessed by the respondents, each attribute profile including a pattern of descriptive statistics indicating a permutation of possessed attributes, identifying one or more item parameters for each item based on the mapping of the items to the set of attributes, where a set of item parameters of the one or more item parameters associated with a first item is subject to a set of linear monotonicity constraints such that the set of item parameters and a first attribute profile of the set of attribute profiles associated with the first item is greater than zero, determining a set of probabilities for each item based on identifying the one or more item parameters, each probability indicating a likelihood of a respective response to a respective item conditional on a respective attribute profile of a respective respondent, and classifying the respondents with attribute profiles based on the responses received for the items and determining the set of probabilities for each item.

A non-transitory computer-readable medium storing code for diagnostic assessment is described. The code may include instructions executable by a processor to receive responses generated by respondents to items configured to classify at least one ability of the respondents, identify a mapping of the items to a set of attributes associated with the respondents, identify a set of attribute profiles representing what attributes are possessed by the respondents, each attribute profile including a pattern of descriptive statistics indicating a permutation of possessed attributes, identify one or more item parameters for each item based on the mapping of the items to the set of attributes, where a set of item parameters of the one or more item parameters associated with a first item is subject to a set of linear monotonicity constraints such that the set of item parameters and a first attribute profile of the set of attribute profiles associated with the first item is greater than zero, determine a set of probabilities for each item based on identifying the one or more item parameters, each probability indicating a likelihood of a respective response to a respective item conditional on a respective attribute profile of a respective respondent, and classify the respondents with attribute profiles based on the responses received for the items and determining the set of probabilities for each item.

Some examples of the method, apparatuses, and non-transitory computer-readable medium described herein may further include operations, features, means, or instructions for augmenting at least one response with a continuous variable using a truncated normal distribution and sampling the at least one response augmented with the continuous variable, where identifying the one or more item parameters may be based on the sampling.

Some examples of the method, apparatuses, and non-transitory computer-readable medium described herein may further include operations, features, means, or instructions for applying a truncated multivariate normal distribution with one or more limits being one or more monotonicity constraints associated with the one or more item parameters, where identifying the one or more item parameters may be based on applying the truncated multivariate normal distribution.

In some examples of the method, apparatuses, and non-transitory computer-readable medium described herein, the one or more item parameters represent an effect that possession of the set of attributes may have on at least one probability of the set of probabilities associated with the respective item.

In some examples of the method, apparatuses, and non-transitory computer-readable medium described herein, at least one item parameter represents an effect that not possessing any of the set attributes associated with an item may have on at least one probability of the set of probabilities associated with the item.

In some examples of the method, apparatuses, and non-transitory computer-readable medium described herein, at least one item parameter represents an effect that possessing one attribute associated with an item may have on at least one probability of the set of probabilities associated with the item.

In some examples of the method, apparatuses, and non-transitory computer-readable medium described herein, at least one item parameter represents an effect that possessing a combination of two or more attributes associated with an item may have on at least one probability of the set of probabilities associated with the item.

Some examples of the method, apparatuses, and non-transitory computer-readable medium described herein may further include operations, features, means, or instructions for applying the set of probabilities to a standard normal cumulative distribution function, where classifying the respondents with the attribute profiles may be based on applying the set of probabilities to the standard normal cumulative distribution function.

Some examples of the method, apparatuses, and non-transitory computer-readable medium described herein may further include operations, features, means, or instructions for generating vector values by applying vector-valued function to the set of attribute profiles and a set of factor pattern matrices used to indicate the attributes measured by each item, where determining the set of probabilities for each item may be based on generating the vector value.

Some examples of the method, apparatuses, and non-transitory computer-readable medium described herein may further include operations, features, means, or instructions for combining the vector values with the one or more item parameters for each item, where determining the set of probabilities for each item may be based on combining the vector values with the one or more item parameters.

In some examples of the method, apparatuses, and non-transitory computer-readable medium described herein, identifying the mapping of the items to the plurality attributed may further include operations, features, means, or instructions for applying a factor pattern matrix to each item, the factor pattern matrix used to indicate the attributes measured by each item.

Some examples of the method, apparatuses, and non-transitory computer-readable medium described herein may further include operations, features, means, or instructions for determining a set of second probabilities for each item, each second probability indicating a likelihood that an observed value of a response may be associated with an attribute profile of the set of attribute profiles.

In some examples of the method, apparatuses, and non-transitory computer-readable medium described herein, a sum of each second probability associated with an item may be equal to one.

Some examples of the method, apparatuses, and non-transitory computer-readable medium described herein may further include operations, features, means, or instructions for identifying outputs of the items based on the responses to the items, where determining the set of probabilities for each item may be based on identifying the outputs of the items.

In some examples of the method, apparatuses, and non-transitory computer-readable medium described herein, the outputs of the items may be configured to be dichotomous.

In some examples of the method, apparatuses, and non-transitory computer-readable medium described herein, the outputs of the items may be configured to be polytomous.

In some examples of the method, apparatuses, and non-transitory computer-readable medium described herein, the responses to the items may be polytomous and include three or more different values.

In some examples of the method, apparatuses, and non-transitory computer-readable medium described herein, the responses to the items may be dichotomous and include two different values.

In some examples of the method, apparatuses, and non-transitory computer-readable medium described herein, each attribute profile of the set of attribute profiles indicates what attributes the respondents lack.

In some examples of the method, apparatuses, and non-transitory computer-readable medium described herein, each attribute includes an unobserved dichotomous characteristic of the respondents.

In some examples of the method, apparatuses, and non-transitory computer-readable medium described herein, each attribute includes an unobserved polytomous characteristic of the respondents.

In some examples of the method, apparatuses, and non-transitory computer-readable medium described herein, an upper limit of a first number of unique attribute profiles may be exponentially related to a second number of the set of attributes mapped to the items.

In some examples of the method, apparatuses, and non-transitory computer-readable medium described herein, a third number of the set of probabilities associated with each item may be equal to the first number of unique attribute profiles.

In some examples of the method, apparatuses, and non-transitory computer-readable medium described herein, identifying the one or more item parameters uses one or more machine learning techniques.

BRIEF DESCRIPTION OF THE DRAWINGS

FIG. 3 illustrates an example of a data structure diagram that supports techniques for diagnostic assessment in accordance with aspects of the present disclosure.

DETAILED DESCRIPTION

Figure 1:
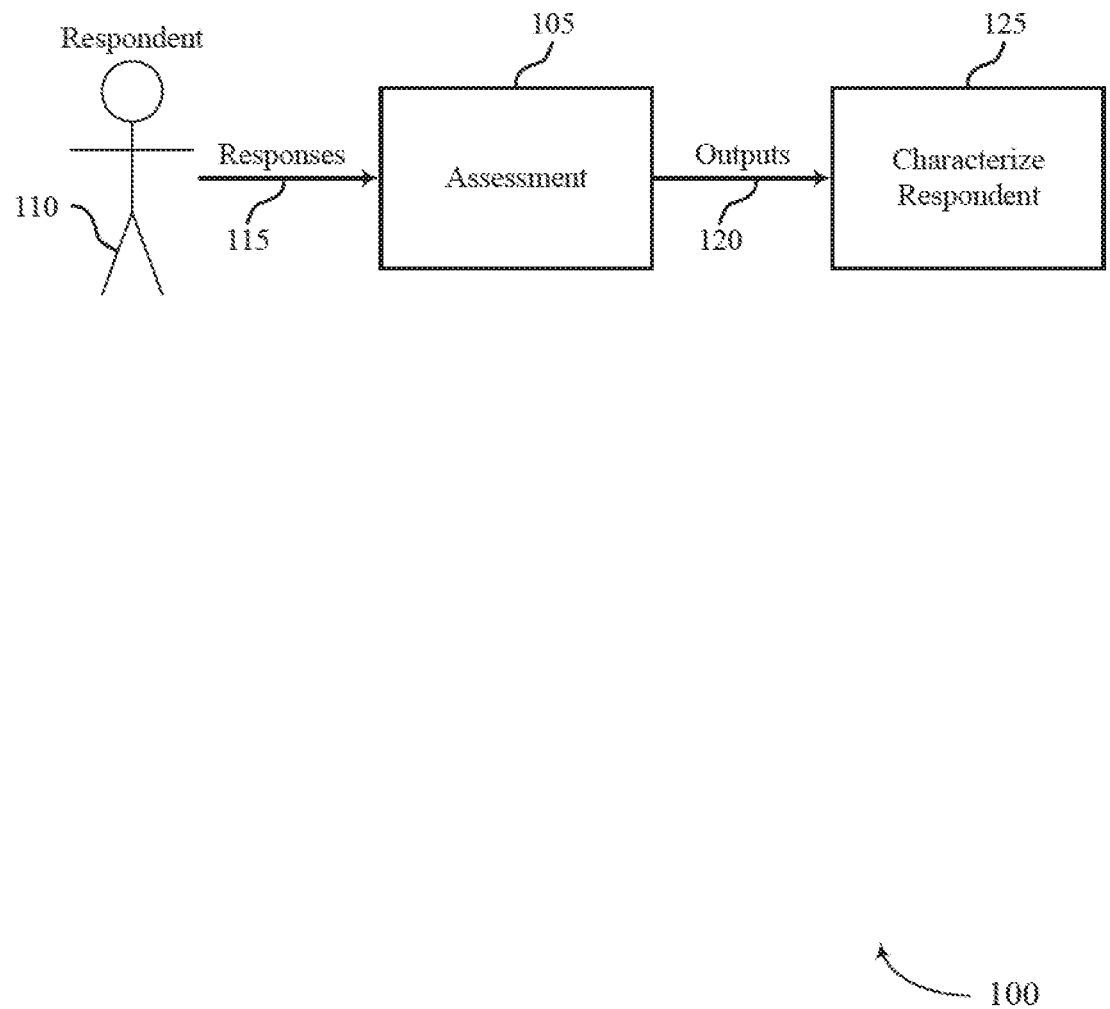
FIG. 1 illustrates an example of an assessment block diagram that supports techniques for diagnostic assessment in accordance with aspects of the present disclosure.

Techniques, methods, systems, and devices for diagnostic assessment of a respondent are described. The techniques for diagnostic assessment may use a classification model to characterize multiple dimensions of the respondent. The classification model may characterize the respondent as having an attribute (e.g., unobserved variable) that is measured by one or more outcomes (e.g., observed variables). The outcomes may be based on responses received from the respondent to items on an assessment. The classification model may also characterize one or more item parameters associated with the items of the assessment. Using the classification model a number of advantages may be realized over other models.

Performance on exams has been assessed using item response theory (IRT) and, prior to that, classical test theory (CTT) methods. These methods provide student scores that are on a continuum, often along an arbitrary metric with predefined upper and lower values. IRT and CTT provided scores that, if assumptions underlying them held, would yield an estimate of the amount error in a given score, more frequently described as a reliability (from CTT) or conditional standard error of measurement (e.g., from IRT). There are two issues that may prevent using these methods in some testing applications: (1) the definitional specificity of the traits being measured are often too broad (e.g., third-grade mathematics) to be useful in instructional settings, and (2) the number of items that must be administered to reach usable levels of reliability or conditional standard errors of measurement across the continua are far too great for frequent assessment of students. Some tests try to address the issues related to specificity using multidimensional versions of IRT or multiple sub-scores in CTT, however, these remedies may lead to tests with tests that include too many items to be administered to students.

The techniques described herein provide solutions that address some of the issues with IRT and CTT assessments. Diagnostic models may provide student feedback using discrete categories (e.g., master vs. non-master) rather than along the continuum that IRT, CTT, and the multidimensional versions of each use. By switching from a continuous measure to a discrete measure, useable levels of reliability can be achieved in small sets of items (e.g., 5-10 per dimension). Therefore, it may be possible to construct tests that provide usable feedback with limited numbers of items. In contrast to other techniques, the techniques described herein may be general enough to accommodate differing assessment specifications and may estimate consistently with efficient algorithms.

The techniques described herein may be constructed in a general form and may estimate using efficient Bayesian methods. Prior model development has led to a class of general models, of which the Loglinear Cognitive Diagnosis Model (LCDM) is one of the most general. The techniques described herein couple an enhancement of the LCDM (using a probit link function) with structural models that can be fully parameterized (as in latent class/finite mixture models) or specified as directed Bayesian Inference Networks, the latter being useful for tracking educational skill acquisition. The probit link function may enable the use of a Gibbs sampling method with monotonicity constraints allowing for direct interpretation of student scores. The Gibbs sampling method may exist for all model parameters, including item parameters, something previously not developed. By using Gibbs sampling over other methods, model estimation convergence time may be reduced, allowing for consistent estimation of model parameters, meaning that the techniques described herein may be used in real-world testing settings.

Aspects of the disclosure are initially described in the context of an assessment block diagram. Aspects of the disclosure are described with reference to data structure diagrams, a path diagram, and a flow chart diagram. Aspects of the disclosure are further illustrated by and described with reference to an apparatus diagram and a flowchart that relate to techniques for diagnostic assessment FIG. 1 illustrates an example of an assessment block diagram 100 that supports techniques for diagnostic assessment in accordance with aspects of the present disclosure. The assessment block diagram 100 illustrates procedures for assessment. The assessment block diagram 100 may include an assessment 105 taken by one or more respondents 110. The assessment 105 may include a plurality of items (i) that are used to measure a characteristic of the respondents 110. The respondents 110 may provide responses 115 to the items of the assessment 105. The assessment 105 may generate one or more outputs 120 based on the responses 115 provided by the respondents 110. The outputs 120 may be used to characterize one or more aspects of the respondents 110. A respondent 110 may be a person from whom data is collected. Items may be portions of the assessment 105 that may be used to classify or diagnose respondents 110. A diagnostic assessment may be a method used to gather data about respondents 110.

The assessment 105 may be used to order respondents based on aptitudes. Some traditional assessments may provide a weak ordering of respondents 110 because of errors in the estimates. For example, after taking a traditional assessment, a respondent 110 may score a seventy (70) out of one hundred (100), which may be an example of an output 120 of the assessment 105. The score (e.g., output 120) of the assessment may be used to characterize the respondent 110. For example, the score of 70/100 may mean that that the respondent 110 has a grade of a "C," or that the respondent 110 is in the 60th percentile of total respondents who have taken the assessment, or the respondent 110 satisfies a threshold (e.g., passes the subject), or any combination thereof.

These types of characterizations and outputs of an assessment may be said to provide a weak ordering of respondents because the outputs provide general data about the respondent. In many cases, a given assessment may test many different attributes of a respondent or many different aspects of a subject. For example, a math assessment may test a respondent's abilities in addition, subtraction, multiplication, or division, or any combination thereof. Traditional assessments that assign a single score may not be able to characterize a respondents ability with respect to individual aspects of the assessment.

Techniques for a diagnostic assessment that characterizes multiple dimensions of a respondent are provided herein. In such diagnostic assessments, the responses 115, the assessment 105, and the outputs 120 may be configured to provide information about multiple attributes tested by the assessment 105. For example, a diagnostic assessment used to test math abilities may be capable of determining whether a respondent 110 has mastered addition, subtraction, multiplication, or division, or any combination thereof.

Some assessments have employed psychometric approaches for multiple dimensions. For example, some assessments may scale sub-scores (e.g., under classical test theory) or some assessments may use multi-dimensional item response theory (MIRT). The techniques described herein provide advantages over some or all of these other approaches for multiple dimensions. For example, the techniques described herein may have improved reliability of estimates for a given number of items in an assessment, the techniques described herein may use fewer items to achieve similar reliability of estimates as other approaches, the techniques described herein may have a higher correlation between dimensions, or the techniques described herein may use smaller samples of data to calibrate item parameters.

The techniques for diagnostic assessment describe herein may use an assessment 105 that includes one or more items configured to measure one or more observed variables. These observed variables may be examples of the outputs 120. The respondent 110 may provide responses 115 to the items and thereby generate the outputs 120 (or observed variables). In some cases, the responses 115 provided by the respondent 110 may be dichotomous, meaning the responses 115 are capable of taking two values (e.g., true or false or a multiple-choice exam with two choices). In some cases, the responses 115 provided by the respondent 110 may be polytomous, meaning the responses are capable of taking three or more values (e.g., a multiple-choice exam with three or more choices or a Likert scale). In some cases, the outputs 120 of the assessment 105 are dichotomous (e.g., did the respondent get the answer correct or incorrect). In some cases, the outputs 120 of the assessment 105 are polytomous (e.g., how correct or incorrect is the response).

In some cases, whether the responses 115 are dichotomous or polytomous may be independent from whether the outputs 120 are dichotomous or polytomous. For example, the responses 115 may be a multiple-choice test with three or more choices (e.g., polytomous), and the outputs 120 may indicate whether the response is incorrect or correct (e.g., dichotomous).

The assessment 105 may be used to identify attributes associated with the respondent 110. The attributes may be examples of latent variables, which may be variables that are not directly observable by the items of the assessment 105 but are rather inferred from the observed variables (e.g., the outputs 120). For example, the attributes may be unobserved (e.g., latent) characteristics underlying the outputs 120 of the assessment 105. For example, if the assessment 105 is to test math abilities, attributes may include whether a respondent 110 has mastered addition, subtraction, multiplication, or division, or a combination thereof. In some cases, the attributes may be dichotomous (e.g., does the respondent 110 possess this attribute or has the respondent 110 mastered this area of knowledge). In some cases, the attributes may be polytomous (e.g., to what degree does the respondent 110 possess this attribute or to what degree has the respondent 110 mastered this area of knowledge).

The assessment 105 may use diagnostic models to analyze the responses 115 provided by respondents 110, analyze the outputs 120 of the assessment 105, and/or classify/diagnose respondents 110 with various attributes associated with the assessment 105. The use of the models described herein may help an assessment realize the advantages described above.

Figures 2A, 2B:
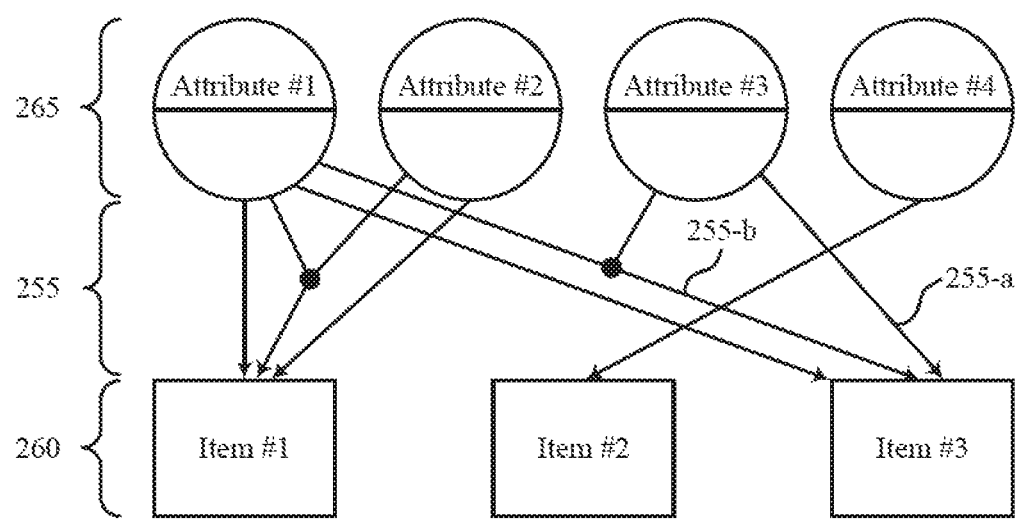
FIG. 2A illustrates an example of a data structure diagram that supports techniques for diagnostic assessment in accordance with aspects of the present disclosure.
FIG. 2B illustrates an example of a path diagram that supports techniques for diagnostic assessment in accordance with aspects of the present disclosure.

FIG. 2A illustrates an example of a data structure diagram 200 that supports techniques for diagnostic assessment in accordance with aspects of the present disclosure. The data structure diagram 200 may illustrate an example of a relationship matrix 205 that includes a plurality of objects 210 (e.g., numbers) that define relationships between items and attributes. In some cases, the relationship matrix 205 may be referred to as a factor pattern matrix, an item-by-latent variable indicator matrix, or a Q-matrix. In some cases, the relationship matrix may be denoted by Q.

The relationship matrix 205 may be an array of objects 210 that includes n rows and m columns. One dimension (e.g., rows) of the relationship matrix 205 may be indexed based on the item of the assessment (e.g., item #1, item #2, item #3, . . . , item #N). In some cases, an index value of an item in an assessment may be denoted by i. The other dimension (e.g., columns) of the relationship matrix 205 may be indexed based on the attribute associated with assessment (e.g., attribute #1, attribute #2, attribute #3, attribute #4, . . . , attribute #M). In some cases, an index value of an attribute associated with the assessment may be denoted by a.

The relationship matrix 205 may indicate the attributes (e.g., latent variables) measured by each item (e.g., observed variables). The relationship matrix 205 may be used to assign loadings in a confirmatory factor analysis. In some cases, objects 210 in the relationship matrix 205 may be dichotomous. In some cases, the objects 210 in the relationship matrix 205 may be polytomous.

An example of a simple relationship matrix 205 for a math assessment is shown in Table 1. In Table 1, the rows are indexed with specific items that may be found on a math assessment and the columns are indexed with specific attributes associated with the assessment. The objects of the relationship matrix 205 may be dichotomous values indicating whether a specific item is used to measure a specific attribute. For example, Table 1 indicates that the first item (e.g., "2+3−1") is used to measure the first attribute (e.g., addition) and the second attribute (e.g., subtraction).

TABLE 1

An Example of Relationship Matrix 205

|  | Addition | Subtraction | Multiplication | Division |
| --- | --- | --- | --- | --- |
| 2 + 3 − 1 | 1 | 1 | 0 | 0 |
| 4/2 | 0 | 0 | 0 | 1 |
| (4 * 2) + 3 | 1 | 0 | 1 | 0 |

The relationship matrix 205 of Table 1 is illustrated as an example only. Relationship matrices 205 may be used to define relationships between any number of parameters and any number of attributes. In addition, relationship matrices 205 may be indexed using any type of parameter and any type of attribute and are not limited to illustrated examples associated with a math assessment.

FIG. 2B illustrates an example of a path diagram 250 that supports techniques for diagnostic assessment in accordance with aspects of the present disclosure. The path diagram 250 may be used to illustrate connections between sets of variables. For example, the path diagram 250 may include a plurality of paths 255 that visually depict possible connections between a set of items 260 and a set of attributes 265.

The paths 255 may illustrate the effect of a respondent possessing one or more attributes on the response provided by the respondent to the item. Some paths 255 may show the effect that possessing a single attribute may have on the response to an item provided by the respondent. For example, the path 255-a shows the effect that possessing the third attribute may have on a respondent's response to the third item. Other paths 255 may show the effect that possessing combinations of attributes may have on the response to an item provided by the respondent. For example, the path 255-b shows the effect that possessing the first attribute and the third attribute may have on the respondent's response to the third item.

Item parameters may be used to characterize magnitudes and/or significance of individual paths between attributes and items. In some cases, item parameters for each path 255 may be defined as part of the model.

The path diagram 250 shows paths 255 that may result from the relationships indicated in the relationship matrix 205 described with reference to FIG. 2A. In this manner, relationships defined by the relationship matrix 205 may at least partially characterize the paths 255 between attributes and items.

FIG. 3 illustrates an example of a data structure diagram 300 that supports techniques for diagnostic assessment in accordance with aspects of the present disclosure. The data structure diagram 300 may illustrate an example of a matrix 305 of attribute profiles of respondents. The matrix 305 may include a plurality of objects 310 (e.g., numbers) that define relationships between respondents and attributes. The matrix 305 may define whether a respondent possesses an attribute or how much of an attribute the respondent possesses.

The matrix 305 may be an array of objects 310 that includes r rows and m columns. One dimension (e.g., rows) of the matrix 305 may be indexed based on the item of the assessment (e.g., respondent #1, respondent #2, respondent #3, . . . , respondent #R). In some cases, an index value of a respondent to an assessment may be denoted by r. The other dimension (e.g., columns) of the matrix 305 may be indexed based on the attribute associated with assessment (e.g., attribute #1, attribute #2, attribute #3, attribute #4, . . . , attribute #M). In some cases, an index value of an attribute associated with the assessment may be denoted by a.

The matrix 305 may indicate the attributes (e.g., latent variables) determined to be possessed by a respondent based on applying a diagnostic model to the outcomes (e.g., observed variables) of an assessment. In some cases, objects 310 in the matrix 305 may be dichotomous. In some cases, the objects 310 in the matrix 305 may be polytomous.

The matrix 305 also shows an attribute profile 315 for each respondent. An attribute profile 315 may represent what attributes are possessed (or not possessed) by the associated respondent. An attribute profile 315 may include a pattern of descriptive statistics (e.g., objects 310) indicating a permutation of attributes possessed by the associated respondent. An example of a dichotomous attribute profile 315 of a respondent that profiles four attributes may be [0 0 1 0]. Such an attribute profile 315 may indicate that the respondent possesses the third attribute but does not possess attributes 1, 2, or 4. In some cases, an attribute profile may be denoted by $\alpha$ and the matrix 305 may be denoted by $\alpha$.

Every unique attribute profile may be identified for a diagnostic model have A number of attributes. In some cases, the number of unique attribute profiles for the diagnostic model may be exponentially related to the number of attributes of the diagnostic model. For example, if the diagnostic model includes three dichotomous attributes, the number of unique attribute profiles is eight (8). The set of unique attribute profiles in such an example may include [000], [001], [010], [011], [100], [101], [110], and [111]. In such an example, the relationship between the number of attributes and the number of attribute profiles may be $2^A$, wherein a is the number of attributes. The base of the exponent may be a function of the number of unique values the attributes can take. Because in this example all of the attributes are dichotomous, the base may be two.

In some cases, the diagnostic model includes three polytomous attributes having three possible values and the number of unique attribute profiles may be twenty-seven (27). The set of unique attribute profiles in such an example may include [000], [001], [002], [010], [011], [012], [020], etc. In such an example, the relationship between the number of attributes and the number of attribute profiles may be $3^A$, wherein a is the number of attributes and three is determined because all of the attributes have three possible values.

In some cases, the diagnostic model may include attributes having a variety of different values. For example, a first attribute of the diagnostic model may be dichotomous and a second attribute may be polytomous. The relationship between the number of unique attribute profiles and the attributes is exponential in this case, but the relationship is more complex than a simple base, power relationship.

Figure 4:
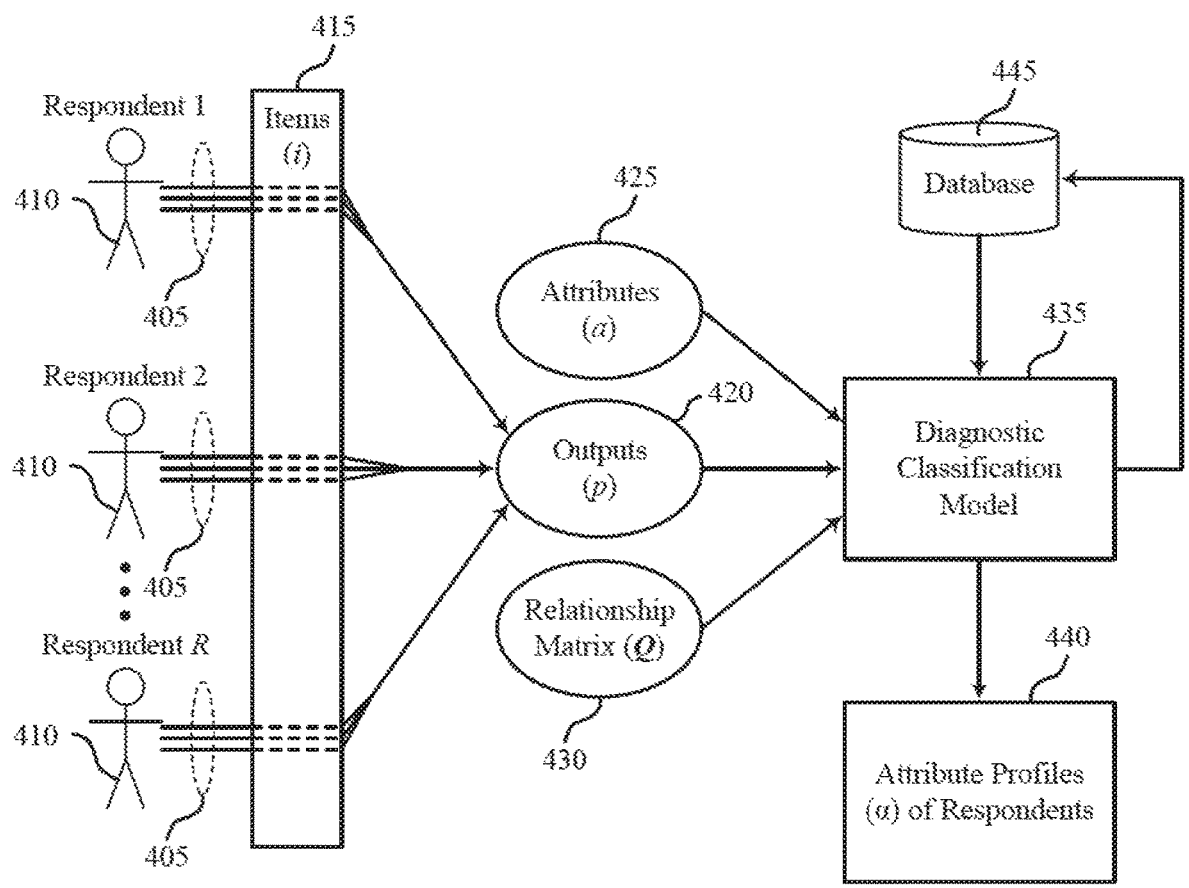
FIG. 4 illustrates an example of a flow chart that supports techniques for diagnostic assessment in accordance with aspects of the present disclosure.

FIG. 4 illustrates an example of a flow diagram 400 that supports techniques for diagnostic assessment in accordance with aspects of the present disclosure. The flow diagram illustrates techniques for using a diagnostic model as part of an assessment of respondents.

The operations of the diagnostic model may be performed by a computing device or a computing system that includes a plurality of computing devices in communication using a network that includes wireless communication links and/or wired communication links. A computing device may be an example of a portable electronic device, a computer, a laptop computer, a tablet computer, a smartphone, a cellular phone, a wearable device, an internet-connected device, a server, a database, or the like. In some examples, the computing device is configured for bi-directional wireless communication with other systems or devices using a base station or access point.

In some cases, the computing device may include a processor, a memory, and/or one or more peripheral components (e.g., input/output devices such as displays, keyboards, mice, speakers, microphone, etc.). The processor may be configured to control at least portions of the computing device. The processor may be a general-purpose processor, a digital signal processor (DSP), an application-specific integrated circuit (ASIC), a field-programmable gate array (FPGA) or other programmable logic device, discrete gate or transistor logic, discrete hardware components, or it may be a combination of these types of components.

Memory may include random-access memory (RAM) and read-only memory (ROM). The memory may store computer-readable, computer-executable software including instructions that, when executed, cause the processor to perform various functions described herein. In some cases, the memory may contain, among other things, a basic input/output system (BIOS) which may control basic hardware or software operation such as the interaction with peripheral components or devices.

In some cases, the diagnostic model may be executed by a computing system that includes a plurality of different computing devices. For example, respondents may provide responses using one or more personal computing devices or one or more data input devices that read paper assessments. In the computing system, the responses and/or the outputs may be communicated using wired and/or wireless communication links to a computing device (e.g., a server) that performs an analysis. In some cases, the computing device may access a data base as part of performing the analysis. Attribute profiles and/or classifications of respondents may be communicated using wired and/or wireless communication links from the computing device to one or more personal computing devices that can output the data to respondents or other interested people. In such cases, operations of the diagnostic model may be distributed across different computing devices in the computing system.

A computing device or computing system (hereinafter called a computing device) may be configured to classify the respondents 410 to an assessment based on one or more attributes associated with the assessment. For example, the computing device may determine whether respondents have mastered one or more topics (e.g., attributes) tested by the assessment. The computing device may perform a probit diagnostic classification model and/or an estimation algorithm as part of this classification.

As part of an assessment, the computing device may receive responses 405 from one or more respondents 410, r, to one or more items 415, i, of an assessment. The items 415 may be configured be configured to classify at least one ability of the respondents 410. The respondents 410 may be examples of the respondents 110 described with reference to FIG. 1. The respondents 410 may be indexed using the term r, and the number of respondents may be between 1 and R. The items 415 may be examples of the items of an assessment 105 described with reference to FIG. 1. The items 415 may be indexed using the term i, and the number of the items 415 may be between 1 and I. The responses 405 may be examples of the responses 115 described with reference to FIG. 1. The responses 405 may be dichotomous or polytomous and may be collected data that indicates behaviors or knowledge of the associated respondent.

The computing device may identify one or more outputs 420 of the items 415 based on the responses 405 of the respondents 410. The outputs 420 may be examples of the outputs 120 described with reference to FIG. 1. The outputs 420 may be indexed with the term p, and the number of outputs may be between 1 and N. In some cases, the outputs 420 may be referred to as observations. The outputs 420 may be examples of observed binary (e.g., dichotomous) variables generated using the responses of the respondents 410. For example, the outputs 420 may indicate whether a respondent 410 got an item correct or incorrect.

The computing device may measure one or more attributes 425, a, of the respondents 410. The attributes 425 may be examples of the attributes described with reference to FIGS. 1 through 3. The attributes 425 may be indexed with the term a, and the number of attributes may be between 1 and A. The attributes 425 may be examples of binary latent variables that are measured for each respondent 410.

When the attributes 425 are measured for each respondent 410, the resulting values form an attribute profile 440, $\alpha$.

The attribute profiles 440 may be an example of the attribute profiles 315 described with reference to FIG. 3. The attribute profiles 440 may be indexed using the term $\alpha$, and the number of unique attribute profiles assignable to respondents may be based on an exponential relationship between the number of attributes and the possible values of the attributes 425, as described with reference to FIG. 3. For example, an attribute profile 440 of a respondent 410 for a plurality of binary attributes 425 may be given by: $\alpha_p = [\alpha_{p1}, \alpha_{p2}, \ldots, \alpha_{pA}]$; $\alpha_{pa} \in \{0,1\}$, where p is the index value of the output 420 of an item 410 and a is the index value of an attribute 425. The computing device may identify a plurality of attribute profiles 440 representing what attributes 425 are possessed by the respondents 410. Each attribute profile may include a pattern of descriptive statistics indicating a permutation of attributes 425 possessed by a respondent 410.

The computing device may map the items 415 to the attributes 425 associated with the respondents 410. The computing device may use a relationship matrix 430 to determine whether an item 415 measures an attribute 425. The relationship matrix 430 may be an example of the relationship matrix 205 described with reference to FIG. 2A. The computing matrix may apply the relationship matrix 430 to the items 415. The relationship matrix 430 may be represented by term Q, where objects of the matrix Q a plurality of objects indexed by the term $q_{ia}$, where i is the index value of items 415 and a is the index value of the attribute. In some cases, each object $q_{ia}$ may be an example of a binary value where $q_{ia}=1$ if the item i measures the attribute a and $q_{ia}=0$ otherwise.

The computing device may apply a diagnostic classification model 435 using the outputs 420, the attributes 425, and the relationship matrix 430 to classify the respondents 410 with an attribute profile 440. The diagnostic classification model 435 may be an example of a probit diagnostic classification model estimation algorithm. In some cases, the diagnostic classification model 435 may be an example of a psychometric model, a classification model, a statistical model, or a combination thereof.

The diagnostic classification model 435 may be configured to measure attributes 425, a=1, ..., A, per respondent 410 and thereby assign attribute profiles 440, $\alpha_p = [\alpha_{p1}, \alpha_{p2}, \alpha_{pA}]$; $\alpha_{pa} \in \{0,1\}$), to the respondents 410. For a set of data Y with associated with items 415, i=1, ..., I, and binary outputs 420, p=1, ..., N, the diagnostic classification model may measure attributes 425, a=1, ..., A for each respondent 410. Each respondent 410 may be assigned a binary value for each attribute 425. In such cases, the respondents 410 may each be classified with an attribute profile 440, $\alpha_p = [\alpha_{p1}, \alpha_{p2}, \alpha_{pA}]$; $\alpha_{pa} \in \{0,1\}$. The diagnostic classification model 435 may apply a relationship matrix 430, Q, to the items to determine which items 415 are associated with which attribute 425, where $q_{ia}=1$ if item i measures attribute a and $q_{ia}=0$ otherwise. The diagnostic classification model 435 may specify that the probability for each output 420, conditional on a respondent's categorical attributes 425 is:

$$P(Y_{pi}=1|\alpha_p) = \Phi^{-1}(\lambda_i^T h\alpha_p, q_i)), \tag{1}$$

In such cases, the computing device that is performing the diagnostic classification model 435 may determine a plurality of probabilities for each item 415 based at least in part on identifying one or more item parameters. Each probability may indicate a likelihood of a response 405 to an item 410 conditional on an attribute profile 440 of a respondent 410.

For a generic number the function $\Phi^{-1}$ is provided by the standard normal cumulative distribution function:

$$\Phi^{-1}(x) = \int_{-\infty}^{x} \frac{1}{\sqrt{2\pi}} \exp\left(-\frac{z^2}{2}\right) dz. \quad (2)$$

In such cases, the computing device that is performing the diagnostic classification model 435 may apply the plurality of probabilities to a standard normal cumulative distribution function. The computing device may classify the respondents 410 with the attribute profiles 440 based at least in part on applying the plurality of probabilities to the standard normal cumulative distribution function.

As part of the diagnostic classification model 435, the computing device may identify one or more item parameters, $\lambda$, for each item 415. In some cases, identifying the item parameters may be based on the mapping of the items 415 to the attributes 425. In some cases, the mapping may include one or more pre-existing relationships stored in a register (e.g., as part of a table or matrix). In some cases, the computing device or other entity that performs the functions of the diagnostic classification model 435 may determine the mapping based on other information. Item parameters may be weighting factors that characterize the items 415 themselves. An item parameter may represent an effect that possession of an attribute 425 by a respondent 410 may have on the probability that the respondent 410 gets that item 415 correct. In some cases, non-zero item parameters may be determined for each path (e.g., paths 255) between items 415 and attributes 425 as described with reference to FIG. 2B.

Thus, the diagnostic classification model 435 may be configured to characterize the items 415 of an assessment as well as the respondents 410. This characterization of items 415 using item parameters may enable the diagnostic classification model 435 to realize some advantages of taking fewer items to achieve estimation reliabilities as compared to other models.

As part of the diagnostic classification model 435, the computing device may use machine learning techniques to tune the item parameters. The computing device may use the outputs 420 and other information to identify item parameter, and the computing device may use data about past item parameters or past assessments or past outputs to identify the item parameters for this assessment. The information about previous item parameters may be retrieved from a database 445. After completing the diagnostic classification model, the computing device may store information about the item parameters or other aspects of the diagnostic classification model in the database 445 as part of machine learning techniques. This way, the diagnostic classification model may be tuned based on the results of the present assessment and thereby potentially improve the results of future assessments.

Item parameters may be configured to characterize the probabilities that a respondent 410 gets a correct response to an item 415 as a function of the attributes 425 possessed by the respondent 410. Item parameters may be determined for a number of different relationships between items an attributes. For example, an item parameter (e.g., the intercept) may represent an effect that not possessing any attributes 425 associated with the item 415 (e.g., using the relationship matrix 430) has on the probability that the respondent 410 gets the item 415 correct. In other examples, an item parameter (e.g., a main effect parameter) may represent an effect that possessing one attribute 425 associated with the item 415 (e.g., using the relationship matrix 430) has on the probability that the respondent 410 gets the item 415 correct. In other examples, an item parameter (e.g., an interaction parameter) may represent an effect that possessing two or more attributes 425 associated with the item 415 (e.g., using the relationship matrix 430) has on the probability that the respondent 410 gets the item 415 correct.

The item parameters may be indexed using the term $\lambda_{i,e,(a_1, \ldots, A)}$, where i refers to an index of the item 415 associated with the item parameter, e refers to a level of an effect (e.g., intercept, main, two-way interaction, three-way interaction, etc.) associated with the item parameter, and $(a1, \ldots, A)$ refers to an index of the one or more attributes associated with the item parameter. For example, in a multi-way item parameter more than one attribute may be associated with the item parameter.

As part of the diagnostic classification model 435, the computing device may generate vector values by applying a vector-valued function to the attribute profiles 440 and values (e.g., objects) of the relationship matrix 430. For example, $h(\alpha_p, q_i)$ may be an example of a vector-valued function. The computing device may combine the vector values with the one or more item parameters for each item. For example, the computing device use $\lambda_i^T h(\alpha_p, q_i)$ as a general linear predictor for any possible set of analysis of variance effects from the attributes 425 measured by the items 415, which can take the form of an analysis of variance style design matrix:

$$\lambda_i^T h(q_i, \alpha_r) = \lambda_{i,0} + \sum_{a=1}^{A} \lambda_{i,1,(a)}(q_{ia}\alpha_{ra}) + \sum_{a=1}^{A-1}\sum_{b=a+1}^{A} \lambda_{i,2,(a,b)}(q_{ia}\alpha_{ra})(q_{ib}\alpha_{rb}) \quad (3)$$

In some cases, the item parameters ($\lambda_i^T$) may be subject to a set of linear monotonicity constraints for an item i, denoted by $C_i$, as shown:

$$\lambda_i^T C_i > 0; \forall i \quad (4)$$

In some cases, a set of item parameters of the one or more item parameters associated with a first item is subject to a set of linear monotonicity constraints such that the set of item parameters and/or a first attribute profile of the plurality of attribute profiles associated with the first item is greater than zero.

In some cases, assuming the items 415 are independent conditional on the attributes 425, the items 415 are binary (dichotomous), and the items 415 follow a Bernoulli distribution, a marginal likelihood function for the data may be given by:

$$P(Y_i) = \sum_{c=1}^{2^A} \eta_c \prod_{i=1}^{I} P(Y_{pi} = 1 | \alpha_p)^{Y_{pi}} (1 - P(Y_{pi} = 1 | \alpha_p))^{1-Y_{pi}}. \quad (5)$$

In cases where the items are polytomous (as opposed to dichotomous), the marginal likelihood function may be different than what is shown in Equation 5.

In some cases, the sum is taken over all possible permutations of unique attributes profiles 440 (e.g., $2^A$ when the attributes are dichotomous). The computing device may determine a plurality of second probabilities, $\eta_c$ for each unique attribute profile. A second probability may be a likelihood that an output 420 has an attribute permutation c, subject to the constraint:

$$\sum_{c=1}^{2^A} \eta_c = 1. \tag{6}$$

As shown above, in some cases, a sum of each second probability associated with an item or a permutation of an attribute may be equal to one. The set of parameters $\eta=[\eta_1, \eta_2, \ldots, \eta_{2^A}]^T$, may extend the diagnostic classification model 435 to the joint distribution of the attributes 425. In some cases, the joint distribution may be an example of a Multivariate Bernoulli Distribution with parameters provided in $\eta$ which can be denoted as:

$$P(\alpha)=\eta \tag{7}$$

In cases where the attributes are polytomous (as opposed to dichotomous), the joint distribution may be different than what is shown in Equation 7.

Further specification of the joint distribution can be given through a series of univariate marginal and conditional distributions for each latent variable as commonly found in Bayesian Belief Networks (BBNs) and machine learning algorithms. The specification of this distribution can be given through a directed acyclic graph (DAG) whereby each attribute 425 is represented as a node in a network. The conditional distribution of the nodes may be indicated by the edges of the graph.

The parameters of this distribution may be modeled using the same or similar methods as described above. Here, the probability of an output p's attribute a taking a value of one is given by:

$$P(\alpha_{pa}=1|\alpha_p)=\Phi^{-1}(\gamma_a^T g(\alpha_p, e_i)) \tag{8}$$

where $g(\alpha_p, e_i)$ may be a vector-valued function that may serve a similar function as $h(\alpha_p, q_i)$ in Equation 1 and $\Phi^{-1}$ may be the probit function from Equation 2. The $\gamma_a^T g(\alpha_p, e_i)$ may form a linear predictor as in Equation 4 as a function of the remaining attributes 425 and $e_i$, an edge list indicator vector of which attributes 425 predict the one being modeled.

Taken as a set, across all attributes 425, it can be shown that the full joint distribution may be modeled as:

$$P(\alpha_p)=\Pi_{a=1}^A P(\alpha_{pa}=1|\alpha_p)^{\alpha_{pa}}(1-P(\alpha_{pa}=1|\alpha_p))^{1-\alpha_{pa}} \tag{9}$$

The diagnostic classification model 435 and/or its associated algorithm has been built to use either the model in Equation 7 or the model in Equation 9, depending on the specification of the analysis by the user.

The diagnostic classification model 435 may use one or more algorithms to perform some of the operations described herein. For example, an algorithm may use Gibbs Sampling to estimate the parameters in and $\lambda_i$, $\gamma_i$, $\eta$, and $\alpha_p$ across all items i and outputs p. The algorithm may include two main steps. In a first step, the computing device may sample the values of $\alpha_p$. In a second step, the computing device may sample the values of $\lambda_i$, $\gamma_i$, $\eta$. In some cases, these parameters within each step may be independent, and the computing device may separate the calculations and perform the calculations in parallel for a faster execution time. In some cases, the two main steps, may be run in serially.

For the first step of sampling the values may be performed using two possible options. A first option may use the conditional distributions formed by Equations 1 and 8. A second option may use the joint distribution specified in Equation 7.

For the first option, generically, the notation may denote parameters $\lambda_i$ and $\gamma_i$ as $\beta_i$, the process is the same for these types of parameters. Similarly, the notation will use the generic, $X_{pi}$ for an output or observation, taking the place of either $Y_{pi}$ and $\alpha_{pa}$ in the above equations. Finally, $h(\alpha_p, q_i)$ and $g(\alpha_p, e_i)$ may be replaced, generically, with the vector-valued function $f(\beta_i, z_i)$.

The computing device may sample $\beta_i$, which may be a multivariate normal distribution with mean $\mu_0$ and covariance matrix $\Sigma_0$ (forming a conjugate prior). First, the computing device may, for each output or observation, augment the observed data $X_{pi}$ with a continuous underlying variable $\tilde{X}_{pi}$:

$$\tilde{X}_{pi} \sim TN(\beta_i^T f(\beta_i, z_i), 1, a, b), \tag{10}$$

where TN $(\mu, \sigma^2, a, b)$ is a truncated normal distribution with mean $\mu=\beta_i^T f(\beta_i, z_i)$, variance $\sigma^2=1$, lower bound a, and upper bound b, such that:

$$X_{pi} = \begin{cases} 0 & a = -\infty, b = 0 \\ 1 & a = 0, b = \infty \end{cases}. \tag{11}$$

In such cases, the computing device may augment at least one response with a continuous variable using a truncated normal distribution. In cases where the data are polytomous (as opposed to dichotomous), Equation 11 may include additional specifications for those different values the data can take.

Second, the computing device may sample $\beta_i$ from:

$$\beta_i \sim TMVN((\Sigma_0^{-1}+f^T(\beta_i, z_i)f(\beta_i, z_i))^{-1}(\Sigma_0^{-1}\mu_0+f^T(\beta_i, z_i)\tilde{X}), (\Sigma_0^{-1}+f^T(\beta_i, z_i)f(\beta_i, z_i))^{-1}, 0, \beta_i^T C_i), \tag{12}$$

where TMVN $(\mu, \Sigma, a, b)$ is a truncated multivariate normal distribution. The limits of the distribution may be set by $\beta_i^T C_i$, with $C_i$ being the series of monotonicity constraints from Equation 4. In the algorithm, rejection sampling may be used to select $\beta_i$. The computing device may sample the at least one response augmented with the continuous variable. The computing device may apply a truncated multivariate normal distribution with one or more limits being one or more monotonicity constraints associated with the one or more item parameters.

In the second option, the computing device may sample $\eta$, which may be a Dirichlet distribution with parameters $b_1, \ldots, b_{2^A}$ (forming a conjugate prior). The computing device may draw $\eta=[\eta_1, \eta_2, \ldots, \eta_{2^A}]^T$ from Dir $(b_1+n_1, \ldots, b_{2^A}+n_{2^A})$ where $n_1, \ldots, n_{2^A}$ are the count of the number of observations with latent permutation $1, \ldots, 2^A$. In these equations, $2^A$ may represent the number of unique attribute profiles in the diagnostic classification model 435 and may be different based on whether the attributes are dichotomous, polytomous, or a combination of both.

In a second step, the computing device may, for each output or observation, sample $\alpha_p$ from $P(\alpha_p|X_p)$ according where each probability is given by:

$$P(\alpha_p = \alpha_c | X_p) = \frac{P(\alpha_c)\prod_{i=1}^{I} P(Y_{pi} = 1 | \alpha_p)^{Y_{pi}}(1 - P(Y_{pi} = 1 | \alpha_p))^{1-Y_{pi}}}{\sum_{c=1}^{2^A} P(\alpha_c)\prod_{i=1}^{I} P(Y_{pi} = 1 | \alpha_p)^{Y_{pi}}(1 - P(Y_{pi} = 1 | \alpha_p))^{1-Y_{pi}}}, \tag{13}$$

Here, $P(\alpha_c)$ can either come from $\eta_c$ in Equation 7 or from a model in Equation 8. If the latter, this calculation can be broken into discrete steps for each attribute 425 rather than sampling the whole distribution jointly.

As part of the diagnostic classification model 435, the computing device may classify the respondents 410 with attribute profiles 440. These classifications may be based on the responses 405 received from the respondent 410 for items 415, the item parameters, the probabilities determined as part of the model, or a combination thereof. The computing device may determine whether a respondent 410 possesses each measured attribute 425. The attribute profile 440 may include a collection of the statistics associated with each attribute.

Figure 5:
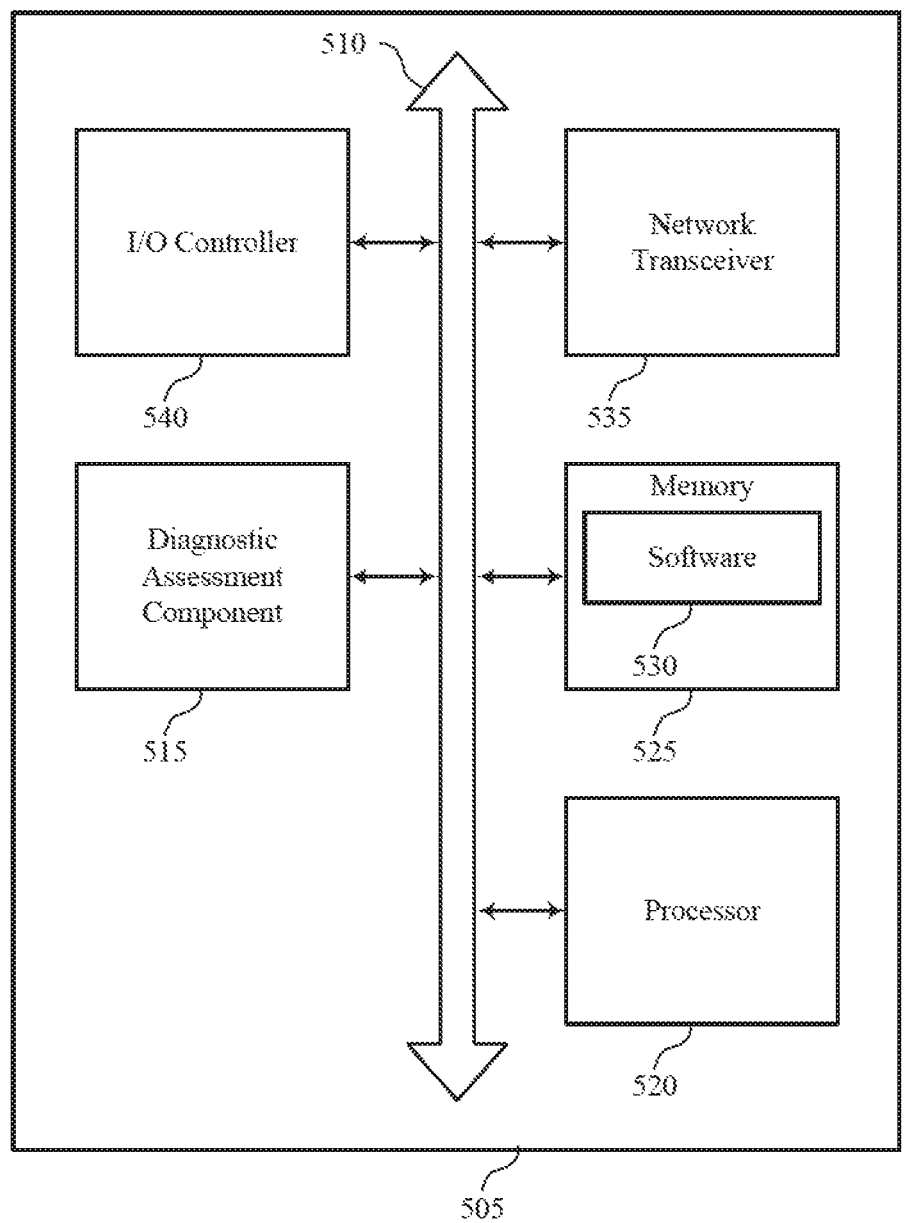
FIG. 5 illustrates a block diagram of a computing device that supports techniques for diagnostic assessment in accordance with aspects of the present disclosure.

FIG. 5 shows a diagram of a system 500 including a device 505 that supports techniques for signaling a channel state information request and a communication link event in accordance with aspects of the present disclosure. The device 505 may be an example of or include the components of computer, computing device, computing system, or other electronic device as described with reference to FIGS. 4, 6, and 7. The device 505 may be an example of a portable electronic device, a computer, a laptop computer, a tablet computer, a smartphone, a cellular phone, a wearable device, an internet-connected device, a server, a database, or the like. In some examples, the device 505 may be configured for bi-directional wireless communication with other systems or devices using a base station or access point.

Device 505 may include a diagnostic assessment component 515, processor 520, memory 525, software 530, network transceiver 535, and I/O controller 540. These components may be in electronic communication via one or more buses (e.g., bus 510). Device 505 may communicate wirelessly with one or more other devices or computing systems over a network using the network transceiver 535.

Diagnostic assessment component 515 may implement the functions described with reference to the flow diagram 400 of FIG. 4. The diagnostic assessment component 515 may be implemented in hardware, software executed by the processor 520, firmware, or any combination thereof. The diagnostic assessment component 515 is described in more detail with reference to FIG. 6.

Processor 520 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). Processor 520 may be configured to execute computer-readable instructions stored in a memory to perform various functions (e.g., functions or tasks supporting techniques for diagnostic assessment).

Memory 525 may include random access memory (RAM) and read only memory (ROM). The memory 525 may store computer-readable, computer-executable software 530 including instructions that, when executed, cause the processor to perform various functions described herein. In some cases, the memory 525 may contain, among other things, a BIOS which may control basic hardware or software operation such as the interaction with peripheral components or devices.

Software 530 may include code to implement aspects of the present disclosure, including code to support techniques for diagnostic assessment. Software 530 may be stored in a non-transitory computer-readable medium such as system memory or other memory. In some cases, the software 530 may not be directly executable by the processor but may cause a computer (e.g., when compiled and executed) to perform functions described herein.

Transceiver 535 may communicate bi-directionally, via one or more antennas, wired, or wireless links. For example, the transceiver 535 may represent a wireless transceiver and may communicate bi-directionally with another wireless transceiver. The transceiver 535 may also include a modem to modulate the packets and provide the modulated packets to the antennas for transmission, and to demodulate packets received from the antennas.

I/O controller 540 may manage input and output signals for device 505. I/O controller 540 may also manage peripherals not integrated into device 505. In some cases, I/O controller 540 may represent a physical connection or port to an external peripheral. In some cases, I/O controller 540 may utilize an operating system such as iOS®, ANDROID®, MS-DOS®, MS-WINDOWS®, OS/2®, UNIX®, LINUX®, or another known operating system. In other cases, I/O controller 540 may represent or interact with a modem, a keyboard, a mouse, a touchscreen, or a similar device. In some cases, I/O controller 540 may be implemented as part of a processor. In some cases, a user may interact with device 505 via I/O controller 540 or via hardware components controlled by I/O controller 540.

Figure 6:
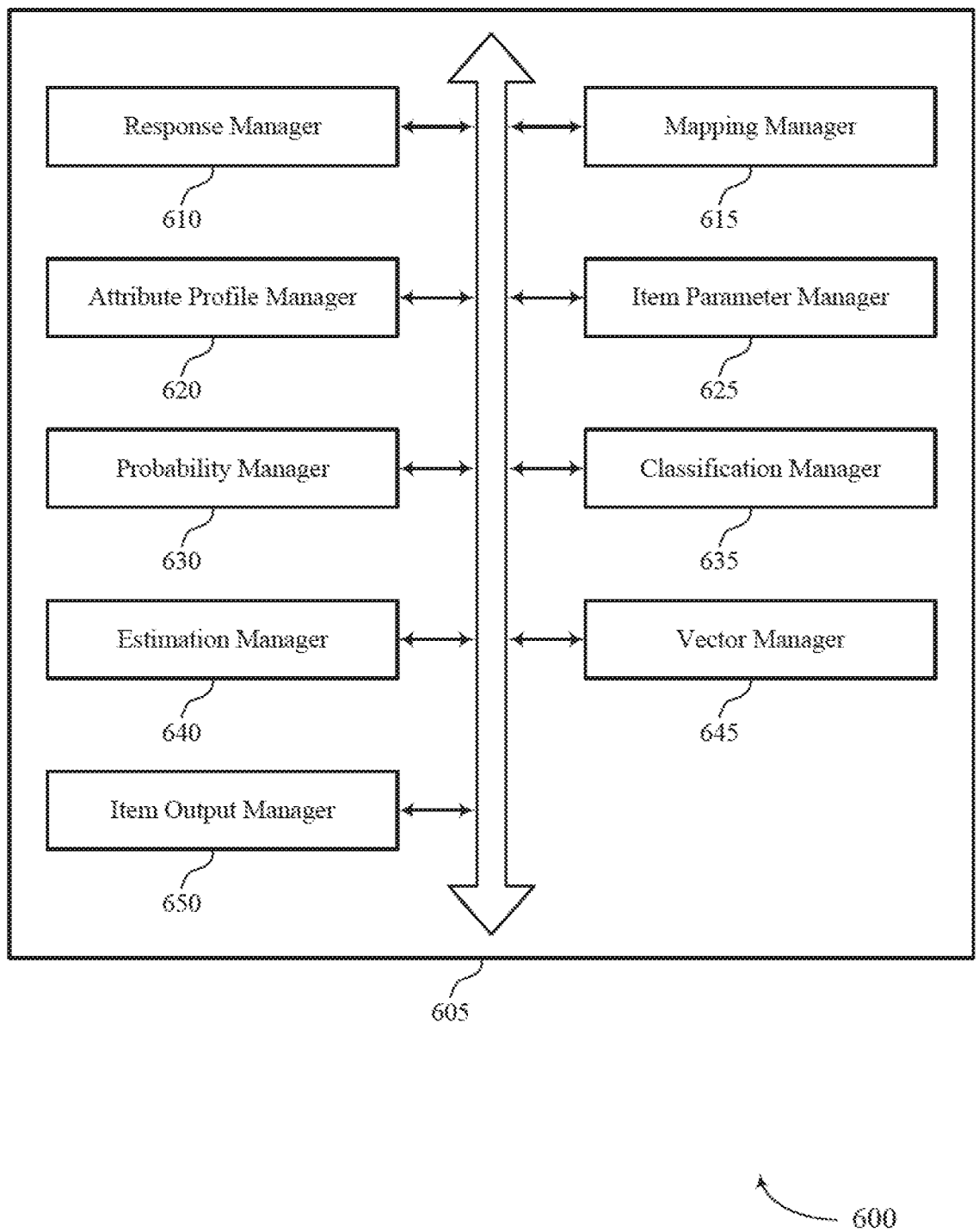
FIG. 6 shows a block diagram of an assessment manager that supports techniques for diagnostic assessment in accordance with aspects of the present disclosure.

FIG. 6 shows a block diagram 600 of a diagnostic assessment component 605 that supports techniques for diagnostic assessment in accordance with aspects of the present disclosure. The diagnostic assessment component 605 may be implemented by a device 505, computing device, or a computing system as described with reference to FIGS. 4 and 5. The diagnostic assessment component 605 may include a response manager 610, a mapping manager 615, an attribute profile manager 620, an item parameter manager 625, a probability manager 630, a classification manager 635, an estimation manager 640, a vector manager 645, and an item output manager 650. Each of these modules may communicate, directly or indirectly, with one another (e.g., via one or more buses).

The response manager 610 may receive responses generated by respondents to items configured to classify at least one ability of the respondents. In some cases, the responses to the items are polytomous and include three or more different values. In some cases, the responses to the items are dichotomous and include two different values.

The mapping manager 615 may map the items to a set of attributes associated with the respondents. In some examples, the mapping manager 615 may apply a factor pattern matrix to items, the factor pattern matrix used to indicate the attributes measured by each item.

The attribute profile manager 620 may identify a set of attribute profiles representing what attributes are possessed by the respondents, each attribute profile including a pattern of descriptive statistics indicating a permutation of possessed attributes. In some cases, each attribute profile of the set of attribute profiles indicates what attributes the respondents lack. In some cases, each attribute includes an unobserved dichotomous characteristic of the respondents. In some cases, each attribute includes an unobserved polytomous characteristic of the respondents. In some cases, an upper limit of a first number of unique attribute profiles is exponentially related to a second number of the set of attributes mapped to the items. In some cases, a third number of the set of probabilities associated with each item is equal to the first number of unique attribute profiles.

The item parameter manager 625 may identify one or more item parameters for each item based on the mapping of the items to the set of attributes, where a set of item parameters of the one or more item parameters associated with a first item is subject to a set of linear monotonicity constraints such that the set of item parameters and a first attribute profile of the set of attribute profiles associated with the first item is greater than zero. In some cases, the one or more item parameters represent an effect that possession of the set of attributes has on at least one probability of the set of probabilities associated with the respective item. In some cases, at least one item parameter represents an effect that not possessing any of the set attributes associated with an item has on at least one probability of the set of probabilities associated with the item. In some cases, at least one item parameter represents an effect that possessing one attribute associated with an item has on at least one probability of the set of probabilities associated with the item. In some cases, at least one item parameter represents an effect that possessing a combination of two or more attributes associated with an item has on at least one probability of the set of probabilities associated with the item.

The probability manager 630 may determine a set of probabilities for each item based on identifying the one or more item parameters, each probability indicating a likelihood of a respective response to a respective item conditional on a respective attribute profile of a respective respondent. In some examples, the probability manager 630 may apply the set of probabilities to a standard normal cumulative distribution function, where classifying the respondents with the attribute profiles is based on applying the set of probabilities to the standard normal cumulative distribution function.

In some examples, the probability manager 630 may determine a set of second probabilities for each item, each second probability indicating a likelihood that an observed value of a response is associated with an attribute profile of the set of attribute profiles. In some cases, a sum of each second probability associated with an item is equal to one.

The classification manager 635 may classify the respondents with attribute profiles based on the responses received for the items and determining the set of probabilities for each item.

The estimation manager 640 may augment at least one response with a continuous variable using a truncated normal distribution. In some examples, the estimation manager 640 may sample the at least one response augmented with the continuous variable, where identifying the one or more item parameters is based on the sampling.

In some examples, the estimation manager 640 may apply a truncated multivariate normal distribution with one or more limits being one or more monotonicity constraints associated with the one or more item parameters, where identifying the one or more item parameters is based on applying the truncated multivariate normal distribution.

The vector manager 645 may generate vector values by applying vector-valued function to the set of attribute profiles and values of a factor pattern matrix used to indicate the attributes measured by each item, where determining the set of probabilities for each item is based on generating the vector value. In some examples, the vector manager 645 may combine the vector values with the one or more item parameters for each item, where determining the set of probabilities for each item is based on combining the vector values with the one or more item parameters.

The item output manager 650 may identify outputs of the items based on the responses to the items, where determining the set of probabilities for each item is based on identifying the outputs of the items. In some cases, the outputs of the items are configured to be dichotomous. In some cases, the outputs of the items are configured to be polytomous.

Figure 7:
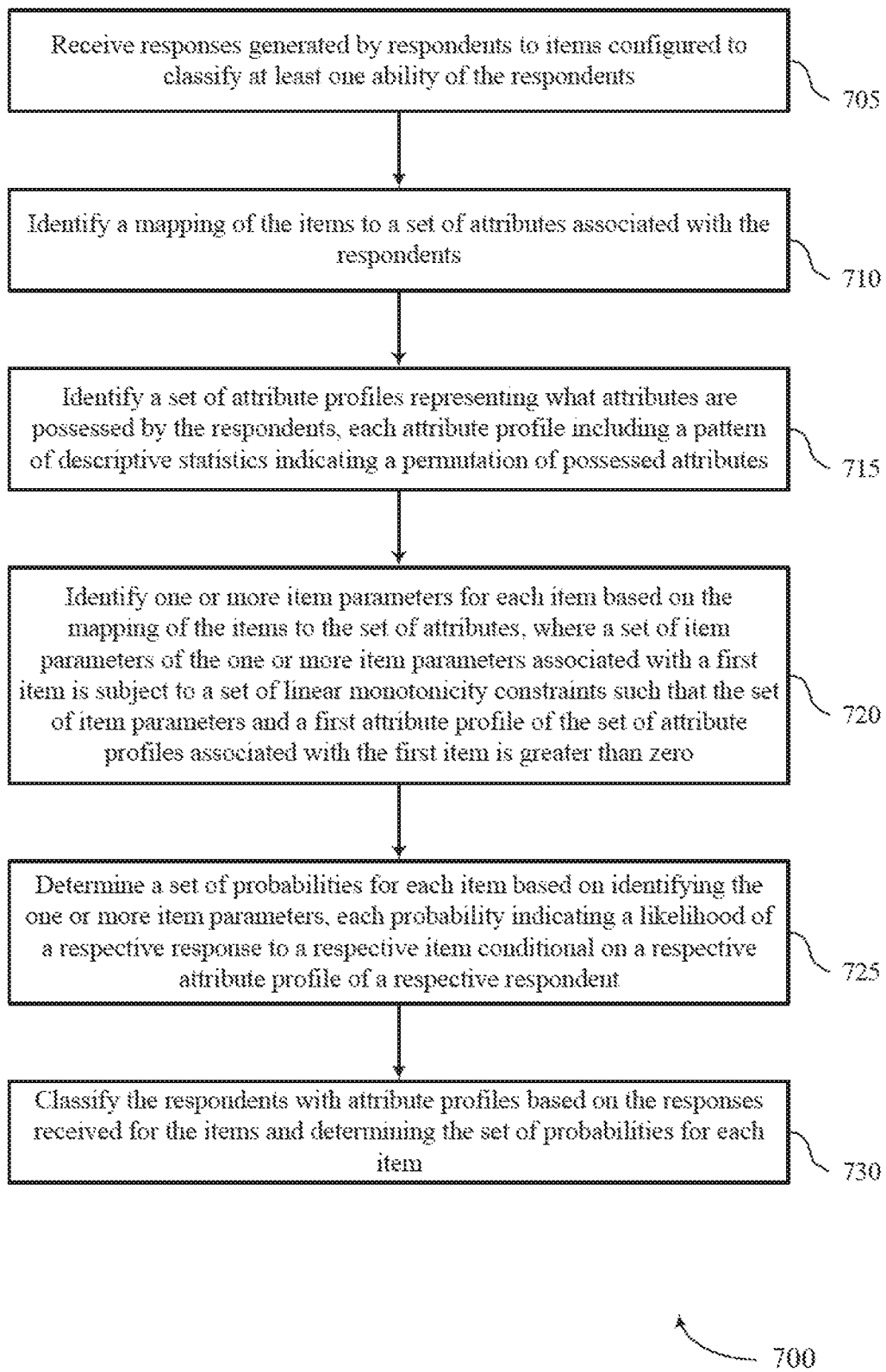
FIG. 7 shows a flowchart illustrating one or more methods that support techniques for diagnostic assessment in accordance with aspects of the present disclosure.

FIG. 7 shows a flowchart illustrating a method 700 that supports techniques for diagnostic assessment in accordance with aspects of the present disclosure. The operations of method 700 may be implemented by device 505, a computing device or its components as described herein. For example, the operations of method 700 may be performed by a device 505, a computing device, a computing system, and/or a diagnostic assessment component 605 as described with reference to FIGS. 4 through 6. In some examples, a computing device may execute a set of instructions to control the functional elements of the computing device to perform the functions described below. Additionally or alternatively, a computing device may perform aspects of the functions described below using special-purpose hardware.

At 705, the computing device may receive responses generated by respondents to items configured to classify at least one ability of the respondents. The operations of 705 may be performed according to the methods described herein. In some examples, aspects of the operations of 705 may be performed by a response manager as described with reference to FIG. 6.

At 710, the computing device may identify a mapping of the items to a set of attributes associated with the respondents. The operations of 710 may be performed according to the methods described herein. In some examples, aspects of the operations of 710 may be performed by a mapping manager as described with reference to FIG. 6.

At 715, the computing device may identify a set of attribute profiles representing what attributes are possessed by the respondents, each attribute profile including a pattern of descriptive statistics indicating a permutation of possessed attributes. The operations of 715 may be performed according to the methods described herein. In some examples, aspects of the operations of 715 may be performed by an attribute profile manager as described with reference to FIG. 6.

At 720, the computing device may identify one or more item parameters for each item based on the mapping of the items to the set of attributes, where a set of item parameters of the one or more item parameters associated with a first item is subject to a set of linear monotonicity constraints such that the set of item parameters and a first attribute profile of the set of attribute profiles associated with the first item is greater than zero. The operations of 720 may be performed according to the methods described herein. In some examples, aspects of the operations of 720 may be performed by an item parameter manager as described with reference to FIG. 6.

At 725, the computing device may determine a set of probabilities for each item based on identifying the one or more item parameters, each probability indicating a likelihood of a respective response to a respective item conditional on a respective attribute profile of a respective respondent. The operations of 725 may be performed according to the methods described herein. In some examples, aspects of the operations of 725 may be performed by a probability manager as described with reference to FIG. 6.

At 730, the computing device may classify the respondents with attribute profiles based on the responses received for the items and determining the set of probabilities for each item. The operations of 730 may be performed according to the methods described herein. In some examples, aspects of the operations of 730 may be performed by a classification manager as described with reference to FIG. 6.

It should be noted that the methods described herein describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks, modules, and managers described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A system for diagnostic assessment, comprising:
 a diagnostic assessment component comprising:
  a response manager configured to:
   receive responses generated by respondents to items configured to classify at least one ability of the respondents; and
   identify outputs of the items based on the responses generated by the respondents;
  a mapping manager configured to:
   map the items to a plurality of attributes associated with the respondents; and
   apply a relationship matrix comprising objects that define relationships between the items and the attributes, wherein the objects are polytomous;
  the mapping manager configured to identify a plurality of attribute profiles representing what attributes are possessed by the respondents, each attribute profile comprising a pattern of descriptive statistics indicating a permutation of possessed attributes;

an item parameter manager configured to:
identify one or more item parameters for each item based at least in part on the mapping of the items to the plurality of attributes, wherein a set of item parameters of the one or more item parameters associated with a first item is subject to a set of linear monotonicity constraints such that the set of item parameters and a first attribute profile of the plurality of attribute profiles associated with the first item is greater than zero, wherein the item parameters comprise a first multi-way item parameter, and wherein two or more attributes are associated with the first multi-way item parameter; and
tune the item parameters using machine learning based on the outputs, past diagnostic assessments, past item parameters, and past outputs, wherein tuning the item parameters comprises:
retrieving the outputs, the past diagnostic assessments, the past item parameters, and the past outputs from a database; and
storing updated item parameters in the database after tuning the item parameters;
a probability manager configured to:
determine a plurality of probabilities for each item based at least in part on identifying the one or more item parameters, each probability indicating a likelihood of a respective response to a respective item conditional on a respective attribute profile of a respective respondent; and
apply the plurality of probabilities to a standard normal cumulative distribution function;
a classification manager configured to classify the respondents with attribute profiles based at least in part on the responses received for the items and determining the plurality of probabilities for each item, wherein classifying the respondents with the attribute profiles is based at least in part on applying the plurality of probabilities to the standard normal cumulative distribution function; and
a vector manager configured to:
generate vector values by applying a vector-valued function to the attribute profiles and the objects of the relationship matrix; and
combine the vector values with the item parameters according to the function:

$$\lambda_i^T h(q_i, \alpha_r) = \lambda_{i,0} + \Sigma_{a=1}^A \lambda_{i,1(a)}(q_{ia}\alpha_{ra}) + \Sigma_{a=1}^{A-1} \Sigma_{b=a+1}^A \lambda_{i,2,(a,b)}(q_{ia}\alpha_{ra})(q_{ib}\alpha_{rb}),$$

where $\lambda$ refers to the item parameters, $h(q_i, \alpha_r)$ refers to the vector-valued function, q refers to the relationship matrix, i refers to the items, $\alpha$ refers to the attribute profiles, r refers to the respondents, and a refers to the attributes; and
a processor in electronic communication with and configured to execute the diagnostic assessment component.

2. The system of claim 1, wherein the diagnostic assessment component further comprises:
an estimation manager configured to:
augment at least one response with a continuous variable using a truncated normal distribution; and
sample the at least one response augmented with the continuous variable, wherein identifying the one or more item parameters is based at least in part on the sampling.

3. The system of claim 2, wherein the estimation manager is further configured to:
apply a truncated multivariate normal distribution with one or more limits being one or more monotonicity constraints associated with the one or more item parameters, wherein identifying the one or more item parameters is based at least in part on applying the truncated multivariate normal distribution.

4. The system of claim 1, wherein the one or more item parameters represent an effect that possession of the plurality of attributes has on at least one probability of the plurality of probabilities associated with the respective item.

5. The system of claim 1, wherein at least one item parameter represents an effect that not possessing any of the plurality attributes associated with an item has on at least one probability of the plurality of probabilities associated with the item.

6. The system of claim 1, wherein at least one item parameter represents an effect that possessing one attribute associated with an item has on at least one probability of the plurality of probabilities associated with the item.

7. The system of claim 1, wherein at least one item parameter represents an effect that possessing a combination of two or more attributes associated with an item has on at least one probability of the plurality of probabilities associated with the item.

8. The system of claim 1, wherein determining the plurality of probabilities for each item is based at least in part on the generated vector value.

9. The system of claim 8, wherein determining the plurality of probabilities for each item is based at least in part on the vector values combined with the one or more item parameters.

10. The system of claim 1, wherein the probability manager is further configured to:
determine a plurality of second probabilities for each item, each second probability indicating a likelihood that an observed value of a response is associated with an attribute profile of the plurality of attribute profiles.

11. The system of claim 10, wherein a sum of each second probability associated with an item is equal to one.

12. The system of claim 1, wherein the diagnostic assessment component further comprises an item output manager configured to:
identify outputs of the items based at least in part on the responses to the items, wherein the plurality of probabilities determined for each item is based at least in part on the identified outputs of the items.

13. The system of claim 1, wherein each attribute profile of the plurality of attribute profiles indicates what attributes the respondents lack.

14. The system of claim 1, wherein each attribute comprises an unobserved dichotomous characteristic of the respondents.

15. The system of claim 1, wherein each attribute comprises an unobserved polytomous characteristic of the respondents.

16. The system of claim 1, wherein an upper limit of a first number of unique attribute profiles is exponentially related to a second number of the plurality of attributes mapped to the items.

17. The system of claim 1, wherein the one or more item parameters are identified using one or more machine learning techniques.

18. The system of claim 1, further comprising characterizing the items based at least in part on the item parameters.

19. An apparatus for diagnostic assessment, comprising:
a processor,
memory in electronic communication with the processor; and
a diagnostic assessment component stored in the memory and executable by the processor, the diagnostic assessment component comprising:
a response manager configured to:
receive responses at the processor generated by respondents to items configured to classify at least one ability of the respondents;
identify outputs at the processor of the items based on the responses of the respondents;
a mapping manager configured to identify a mapping at the processor of the items to a plurality of attributes associated with the respondents, wherein a first attribute of the attributes is polytomous and indicates a degree to which a respective respondent of the respondents possesses the first attribute of the attributes, wherein the mapping comprises a relationship matrix that assigns loadings to the attributes measured by each of the items in a confirmatory factor analysis, and wherein the loadings are polytomous;
an attribute profile manager configured to identify a plurality of attribute profiles at the processor representing what attributes are possessed by the respondents, each attribute profile comprising a pattern of descriptive statistics indicating a permutation of possessed attributes;
an item parameter manager configured to:
identify one or more item parameters at the processor for each item based at least in part on the mapping of the items to the plurality of attributes, wherein a set of item parameters of the one or more item parameters associated with a first item is subject to a set of linear monotonicity constraints such that the set of item parameters and a first attribute profile of the plurality of attribute profiles associated with the first item is greater than zero; and
tune the item parameters at the processor using machine learning based on the outputs, past diagnostic assessments, past item parameters, and past outputs, wherein tuning the item parameters comprises:
retrieving by the processor the outputs, the past diagnostic assessments, the past item parameters, and the past outputs from a database; and
storing by the processor updated item parameters in the database after tuning the item parameters;
a probability manager configure to:
determine a plurality of probabilities at the processor for each item based at least in part on identifying the one or more item parameters, each probability indicating a likelihood of a respective response to a respective item conditional on a respective attribute profile of a respective respondent; and
apply the plurality of probabilities at the processor to a standard normal cumulative distribution function;
a classification manager configured to classify the respondents at the processor with attribute profiles based at least in part on the responses received for the items and determining the plurality of probabilities for each item, wherein the respondents are classified with the attribute profiles based at least in part on the plurality of probabilities being applied to the standard normal cumulative distribution function; and
a vector manager configured to:
generate at the processor vector values by applying a vector-valued function to the attribute profiles and the loadings of the relationship matrix; and
combine at the processor the vector values with the item parameters according to the function:

$$\lambda_i^T h(q_i,\alpha_r) = \lambda_{i,0} + \Sigma_{a=1}^{A}\lambda_{i,1(a)}(q_{ia}\alpha_{ra}) + \Sigma_{a=1}^{A-1}\Sigma_{b=a+1}^{A}\lambda_{i,2,(a,b)}(q_{ia}\alpha_{ra})(q_{ib}\alpha_{rb}),$$

where $\lambda$ refers to the item parameters, $h(q_i, \alpha_r)$ refers to the vector-valued function, q refers to the relationship matrix, i refers to the items, $\alpha$ refers to the attribute profiles, r refers to the respondents, and a refers to the attributes.

20. A computing device for diagnostic assessment comprising:
a processor; and
a diagnostic assessment component in electronic communication with and executable by the processor, the diagnostic assessment component comprising:
a response manager configured to:
receive responses at the processor generated by respondents to items configured to classify at least one ability of the respondents; and
identify outputs at the processor of the items based on the responses to the items, wherein a first output of the outputs is polytomous and indicates a degree of correctness of a first response of the responses to a first item of the items;
a mapping manager configured to identify a mapping at the processor of the items to a plurality of attributes associated with the respondents, wherein the mapping comprises a relationship matrix comprising objects that define relationships between the items and the attributes, wherein the objects are polytomous;
an attribute profile manager configured to identify a plurality of attribute profiles at the processor representing what attributes are possessed by the respondents, each attribute profile comprising a pattern of descriptive statistics indicating a permutation of possessed attributes;
an item parameter manager configured to:
identify one or more item parameters at the processor for each item based at least in part on the mapping of the items to the plurality of attributes, wherein a set of item parameters of the one or more item parameters associated with a first item is subject to a set of linear monotonicity constraints such that the set of item parameters and a first attribute profile of the plurality of attribute profiles associated with the first item is greater than zero; and
tune the item parameters at the processor using machine learning based on the outputs, past diagnostic assessments, past item parameters, and past outputs, wherein tuning the item parameters comprises:
retrieving by the processor the outputs, the past diagnostic assessments, the past item parameters, and the past outputs from a database; and
storing by the processor updated item parameters in the database after tuning the item parameters;
a probability manager configured to:
determine a plurality of probabilities at the processor for each item based at least in part on identifying the one or more item parameters, each probability indicating a likelihood of a respective response to a respective item conditional on a respective attribute profile of a respective respondent; and apply the plurality of probabilities at the processor to a standard normal cumulative distribution function;

a classification manager configured to classify at the processor the respondents with attribute profiles based at least in part on the responses received for the items and determining the plurality of probabilities for each item, wherein the respondents are classified with the attribute profiles based at least in part on the plurality of probabilities being applied to the standard normal cumulative distribution function; and a vector manager configured to:
generate at the processor vector values by applying a vector-valued function to the attribute profiles and the loadings of the relationship matrix; and
combine at the processor the vector values with the item parameters according to the function:

$$\lambda_i^T h(q_i, \alpha_r) = \lambda_{i,0} + \Sigma_{a=1}^A \lambda_{i,1(a)}(q_{ia}\alpha_{ra}) + \Sigma_{a=1}^{A-1} \Sigma_{b=a+1}^A \lambda_{i,2,(a,b)}(q_{ia}\alpha_{ra})(q_{ib}\alpha_{rb}),$$

where $\lambda$ refers to the item parameters, $h(q_i, \alpha_r)$ refers to the vector-valued function, q refers to the relationship matrix, i refers to the items, $\alpha$ refers to the attribute profiles, r refers to the respondents, and a refers to the attributes.

* * * * *